Dec. 14, 1948.   G. A. SMITH   2,455,955
WING TIP FLOAT STRUCTURE FOR AIRCRAFT
Filed May 5, 1945

INVENTOR.
GLENN A. SMITH
BY
Ralph L. Chappell
ATTORNEY

Patented Dec. 14, 1948

2,455,955

UNITED STATES PATENT OFFICE 2,455,955

WING-TIP FLOAT STRUCTURE FOR AIRCRAFT

Glenn A. Smith, United States Navy

Application May 5, 1945, Serial No. 592,157

3 Claims. (Cl. 244—105)

(Granted under the act of March 3, 1883, as amended April 30, 1928; 370 O. G. 757)

This invention relates to new and useful improvements in float structures for aircraft, and more particularly to wing tip float structures for seaplanes, amphibious aircraft and the like.

It is the customary practice to provide seaplanes, amphibious and like aircraft with float structures at the underside of the wing adjacent the tips or ends thereof for the purpose of providing lateral stability to the plane during take-off and landing thereof on water and to prevent the tips of the wing from contacting or striking the water with resulting damage thereto and to the plane. Prior to the present invention such float structures generally have been either secured permanently in a fixed position beneath the wing of the plane, or have been pivotally mounted for movement between a lowered position beneath the wing for contact with the water and a raised or elevated position in which the float is disposed endwise of the wing forming the tip or end section thereof.

Both of these arrangements are aerodynamically inefficient and objectionable. In the type of float structure first mentioned, the fixed float is designed and contoured primarily to provide optimum hydroplaning action when in contact with the water and therefore does not provide an efficient streamlined form having a small frontal area that presents a minimum amount of resistance to the air when the plane is in flight. On the other hand, in the second type of float structure, the float or hull which likewise is contoured to provide optimum hydroplaning action in water, when lowered for use during take-off or landing, does not provide an efficient aerodynamic surface when in the raised or elevated position endwise of the wing and forming the tip or end section thereof.

With the foregoing in mind, it is the principal object of the present invention to provide a novel wing tip float structure for aircraft that provides optimum hydroplaning action in water during take-off and landing, and provides an efficient streamlined form presenting a small frontal area with minimum resistance to the air when the plane is in flight.

Another object of the invention is to provide a novel wing tip float structure having the stated characteristics comprising a hull member which is selectively positionable relative to the surface of a body of water to provide optimum hydroplaning action of the member in the water.

A further object of the present invention is to provide a novel wing tip structure of the stated character comprising a housing shell having associated therewith a hull member cooperable with said housing in one position of said hull member to provide a float structure of efficient streamlined form having a small frontal area presenting a minimum resistance to air when the plane is in flight, the hull member being selectively positionable relative to the housing and to the surface of a body of water to provide optimum hydroplaning action on the water during take-off and landing of the plane.

These and other objects of the invention and the various features and details of the construction and operation thereof are hereinafter fully set forth and described with reference to the accompanying drawing, in which.

Figure 1:
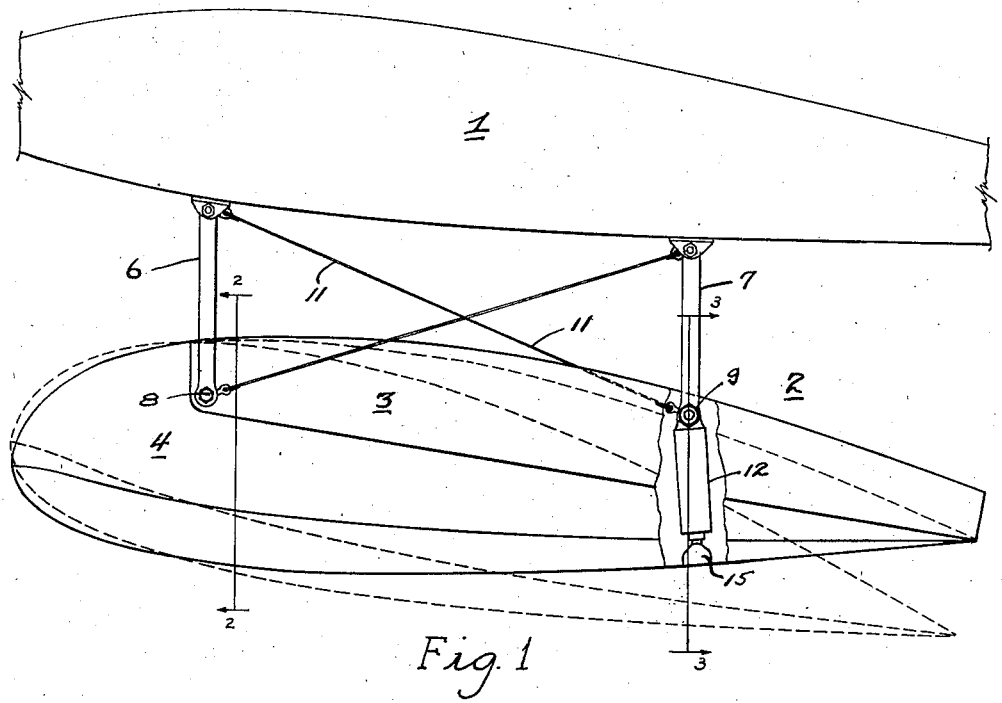
Fig. 1 is a side elevation view of a wing tip float structure for aircraft embodying the present invention.

Referring now to the drawing, and more particularly to Fig. 1 thereof, reference numeral 1 designates the wing structure of a seaplane, amphibious or like aircraft, and numeral 2 generally designates a wing tip float structure made in accordance with the present invention which comprises, in the embodiment shown, a housing shell or shield member 3 and an associated hull member 4, suitably supported beneath the plane wing structure 1 adjacent the outer ends or tips thereof.

The housing member 3 of the float structure 2 is of generally inverted U, or upwardly arched, cross-sectional shape that tapers gradually rearwardly to a point as shown, and this housing member 3 may be supported beneath the plane wing structure 1 in the relation shown, for example, by means of suitable pairs of struts or the like 5, 6 and 7, respectively. The struts 5 may have their upper ends secured to the underside of the wing structure 1 and extend vertically downward with their lower ends secured to the float structure housing member 3 at opposite sides thereof adjacent the forward end by means of bolts, rivets or like fasteners 8, while the struts 6 may have their upper ends similarly secured to the wing 1 and extend angularly downward to the housing member 3 with their lower ends likewise secured thereto by means of said fasteners 8. The pair of struts 7 support the housing member 3 toward the rear end thereof, and these may be secured to the underside of the wing 1 and decline angularly therefrom as shown with their lower ends secured together, for example, by means of a bolt, rivet or like fastener 9. The connected end portions of the struts 7 may extend inwardly of the housing member 3 through an opening formed centrally therein, with respect to the sides of the member 3, for a purpose hereinafter set forth, and the housing member 3 may be welded or otherwise permanently secured to said struts 7 as indicated at 10. In addition to the pairs of struts 5, 6 and 7, the float structure may be supported and braced against the drag of water thereon in the fore and aft direction by means of guy wires, rods or the like 11 arranged, for example, as shown in the drawing.

Figure 2:
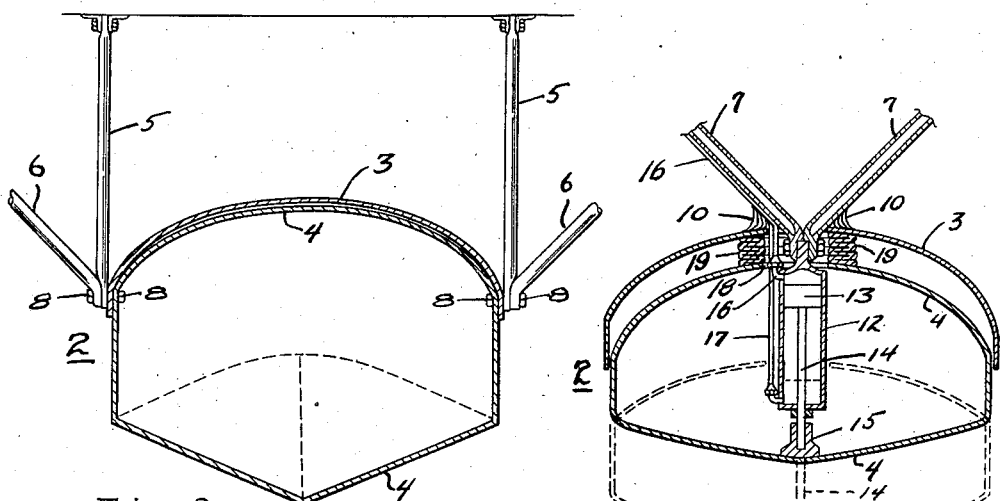
Fig. 2 is an enlarged sectional view taken on line 2—2, Fig. 1.
Figure 3:
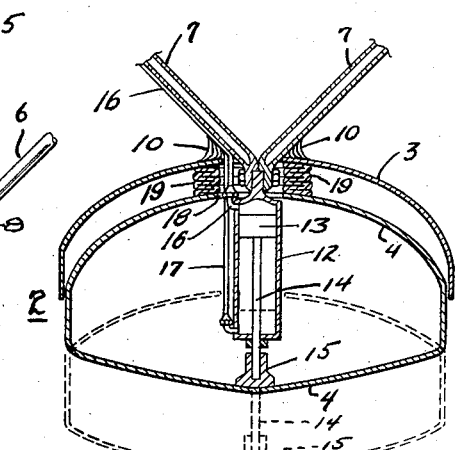
Fig. 3 is an enlarged sectional view taken on line 3—3, Fig. 1.

The hull member 4 of the wing tip float structure 2 is constructed and arranged for pivotal movement relative to the fixed housing member 3 between a raised or elevated position nesting within the housing 3 as shown in solid lines in the drawing, and a selected lowered position with respect to said housing wherein the after portion of the hull member is presented to the surface of the water, for example, as shown in dotted lines in Figs. 1 and 3, to provide optimum hydroplaning action of said hull member 4 in the water. To this end, the hull member 4 of the float structure 2 is pivoted, adjacent its forward end, to the housing member 3 and the aforesaid fasteners 8 may be employed and utilized for this purpose in the manner shown in Fig. 2 of the drawing.

In accordance with the present invention the hull member 4 may be lowered and elevated relative to the housing member 3 of the float structure about the fastener pivots 8, for example, by suitable hydraulic means comprising a cylinder 12 having therein a piston 13 provided with a connecting or piston rod 14 that projects outwardly of one end of said cylinder 12. This cylinder-piston assembly may be operatively interconnected between the housing member 3 and hull member 4, to raise and lower the latter relative to the housing, in the manner best shown in Fig. 3 of the drawing, by pivotally mounting the closed end of the cylinder 12 for limited pivotal movement upon the fastener 9 in a fore and aft direction, and pivotally connecting the free end of the piston rod 14 to a suitable standard 15 that is fixedly secured to the interior of the bottom wall portion of the hull member 4.

Fluid may be selectively introduced into the cylinder 12 at opposite sides of the piston 13 by means of suitable pipes or tubes 16 and 17, respectively, to lower and elevate the hull member 4 relative to the housing member 3, and by regulating the fluid introduced into the cylinder 12 through pipe 16 to lower the hull member 4, the position of the latter may be controlled in order that the hull member may be presented to the surface of the water to provide optimum hydroplaning action thereon. The top wall portion of the hull member 4 is provided with a suitable opening 18 therein so that said hull member may clear the cylinder 12 when the piston 13 therein is actuated to lower the hull member 4 relative to the housing member 3, and means, such as bellows 19 may be provided between the housing and hull members about the opening 18 to prevent the entrance of water into the hull member 4.

In operation of a wing tip float structure made according to the present invention, when aircraft equipped therewith is at rest upon the surface of a body of water, the hull members 4 of the wing tip floats adjacent opposite ends of the wing are maintained in a lowered position relative to their housing member 3 in contact with the water by maintaining a predetermined quantity of fluid in the cylinder 12 above the piston 13 of each float structure, and when taking off from the surface of the water the hull members 4 are positioned and adjusted to provide optimum hydroplaning action thereof upon the water by varying the position of the piston 13 as required.

When the plane is airborne, the hull members 4 of the wing tip float structures are elevated and nested within their associated housing members 3 by releasing the pressure in the pipe 16 and introducing sufficient fluid into the cylinder 12 through pipe 17 to raise and maintain the hull members 4 in the position shown in solid lines in Figs. 1 and 3 of the drawing. The contours of the housing member 3 and the hull member 4 are such that when the latter is elevated and nesting within the housing member 3, the float structure presents an efficient streamlined form having a small frontal area that affords minimum resistance to the air when the plane is in flight.

As the plane descends preparatory to making a landing on water, the hull members 4 are lowered relative to their housings 3 so as to engage with the water by releasing fluid from the cylinder through pipe 17 and introducing sufficient fluid into the cylinder 12 through the pipe 16 to actuate the piston 13 and its rod 14 downwardly with reference to Fig. 3, the particular lowered position of the hull members 4 that is desired for optimum hydroplaning action thereof on the water being obtainable as required by controlling the position of the hull members 4 with respect to their housings 3 through regulation of the amount of fluid within the cylinder 12 that is acting on the piston 13.

From the foregoing it will be observed that the present invention provides a wing tip float structure for seaplanes, amphibious and like aircraft that is constructed and arranged to provide optimum hydroplaning action in water during take-off and landing of the plane and which provides an efficient streamlined form presenting a small frontal area with minimum resistance to the air when the plane is in flight. The invention also provides a wing tip float structure having the stated characteristics comprising a hull member that is selectively positionable as required relative to the surface of a body of water to provide optimum hydroplaning action of the hull member in the water.

While a particular embodiment of the present invention has been illustrated and described herein, it is not intended that the inventor be limited to such disclosure, and changes and modifications may be made therein and thereto within the scope of the claims.

The invention described herein may be manufactured and used by or for the Government of the United States of America for governmental purposes without the payment of any royalties thereon or therefor.

I claim:

1. For use on an airfoil, at least one pair of strut structures and a single strut structure, the respective structures depending rigidly from the airfoil and spaced in the front to rear direction, a cover occupying a position between the strut structures, being affixed to the rear strut structure and extending into approximation with the pair of front strut structures, a hull member underlying the cover and partially housed thereby, fastener means rigidly securing the front of the cover to the pair of struts and simultaneously supporting the hull member for pivotal movement in respect to the cover, and telescopically contrived pressure fluid-operable means having its relatively movable components respectively pivotally attached to the hull and to the rear strut structure.

2. For use on an airfoil, at least one pair of strut structures and a single strut structure, the respective strut structures depending rigidly from the airfoil and spaced in the front to rear direction, a cover occupying a position between the strut structures, having an opening through which the terminal of the rear strut structure extends to render it accessible, said cover being affixed to the rear strut structure and extending forwardly into approximation with the pair of front strut structures, a hull member underlying the cover and partially housed thereby, fastener means rigidly securing the front of the cover to the pair of struts and simultaneously supporting the hull member for pivotal movement in respect to the cover, and telescopically contrived pressure fluid-operable means having its relatively movable components respectively pivotally attached to the hull member and to said accessible terminal of the rear strut structure.

3. A wing tip float comprising a hollow two-part body consisting of a hull member and a cover respecting which the hull member is partly nested, means rigid relatively to the float constituting the common forward fixing point for the cover and pivot for the hull member, telescopically contrived pressure fluid-operable means having one of its relatively movable components pivotally attached to the hull member, and a combined anchor for the rear of the cover and point of pivotal attachment for the other component of the telescopic means.

GLENN A. SMITH.

REFERENCES CITED

The following references are of record in the file of this patent:

UNITED STATES PATENTS

| Number | Name | Date |
|---|---|---|
| 1,156,215 | Curtiss | Oct. 12, 1915 |
| 1,526,674 | Martin | Feb. 17, 1925 |
| 1,684,818 | Burnelli | Sept. 18, 1928 |
| 1,963,630 | Procofieff-Seversky | June 19, 1934 |
| 2,110,865 | Burgess | Mar. 15, 1938 |
| 2,347,841 | Parker | May 2, 1944 |

FOREIGN PATENTS

| Number | Country | Date |
|---|---|---|
| 741,914 | France | Dec. 20, 1932 |
| 557,444 | Great Britain | Nov. 22, 1943 |